Feb. 18, 1964    S. R. HOH    3,121,265
THERMOMAGNETIC DEVICE
Filed May 9, 1961    2 Sheets-Sheet 1

INVENTOR.
SIEGFRIED R. HOH
BY
Schramm, Kramer + Sturges
ATTORNEYS.

Feb. 18, 1964 S. R. HOH 3,121,265
THERMOMAGNETIC DEVICE
Filed May 9, 1961 2 Sheets-Sheet 2

INVENTOR.
SIEGFRIED R. HOH
BY
ATTORNEYS.

United States Patent Office 3,121,265
Patented Feb. 18, 1964

3,121,265
THERMOMAGNETIC DEVICE
Siegfried R. Hoh, 240 Forest St., Belleville, N.J.
Filed May 9, 1961, Ser. No. 107,810
31 Claims. (Cl. 20—62)

This invention relates to energy responsive apparatus and concerns particularly arrangements for responding to variations in location of a source of radiant energy. The invention also concerns arrangements for responding to or employing heat or temperature effects of magnetic material.

An object of the invention is to accomplish orientation with respect to a source of radiant energy without the aid of sensors, servo systems or power supplies.

A more specific object of the invention is to accomplish magnetic orientation with respect to a heat source.

A further object of the invention is to provide a heliostat for automatically tracking the sun.

A further object of the invention is to provide automatic orientation or adjustment for devices such as Venetian blinds and solar energy converters.

Still another object of the invention is the measurement of the direction of heat flux and attitude indication for moving devices such as high-speed aircraft and reentry vehicles.

A further object of the invention is to provide simple, sturdy, reliable and relatively inexpensive heliostats and orientation equipment for detection or utilization of radiant energy.

Another object is to provide improvements in satellites and space vehicles and means for stopping spin thereof as well as controlling orientation of solar energy converter therein.

Other and further objects, features and advantages of the invention will become apparent as the description proceeds.

In carrying out the invention in accordance with a preferred form thereof, a ring or substantially peripherally extending member of permeable magnetic material is provided which has a relatively high temperature coefficient of magnetic permeability. A magnet is provided which is rotatable with respect to an axis within or at the center of the peripheral magnetic member with pole pieces lying along a diameter of the ring or extending between points spaced with respect to the periphery of the permeable magnetic member.

The peripheral magnetic member is so mounted or positioned that at least one portion or side thereof is exposed to a source of radiation whereby the portion of the ring upon which the radiation falls absorbs such radiation and is heated. This unbalances the magnetic permeability around the permeable magnetic member and causes the magnet to rotate to a position which is substantially perpendicular to the direction from which the radiation is received or which is away from the side of the peripheral member which is exposed to the source of radiant energy.

A better understanding of the invention will be afforded by the following detailed description considered in conjunction with the accompanying drawing in which.

Like reference characters are utilized throughout the drawing for designating like parts.

Figure 1:
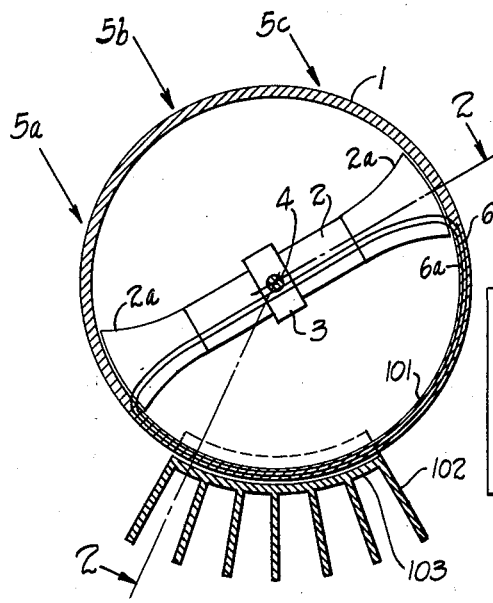
FIG. 1 is a schematic diagram representing a plan view of one embodiment of the invention.
Figure 2:
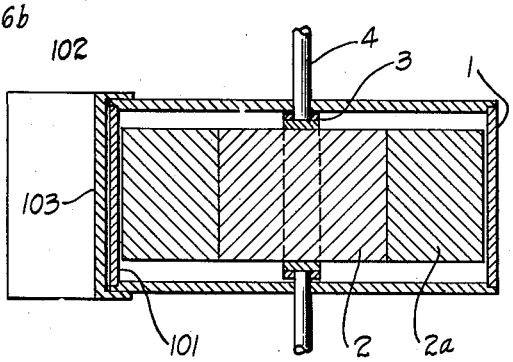
FIG. 2 is a view of a section of the apparatus of FIG. 1 represented as cut by a plane 2—2.
Figure 3:
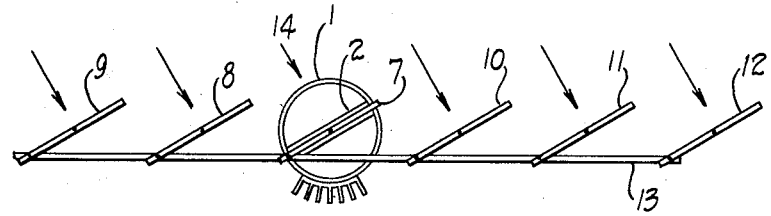
FIG. 3 is a schematic diagram of an automatically adjusting Venetian blind employing a unit of the type illustrated in FIGS. 1 and 2 for maintaining the slats of the blind perpendicular to the sun's rays for maintaining the ventilation through the slats without permitting the sun's rays to pass through the Venetian blind.

In a form of orientation unit illustrated in FIGS. 1, 2 and 3 there is a ring 1 composed of permeable magnetic material within which a permanent magnet 2 is mounted within a yoke or cradle or clamp 3 by a pin 4 passing through the center of the magnet 2 and rotatable in the cradle 3 so that the magnet may rotate to any angular position within the ring 1 while always being directed along some diameter of the ring 1, the pin 4 lying along the axis of the ring 1. Although the invention does not exclude the use of an integral permanent magnet extending substantially to the inner periphery of the ring 1 with pole faces conforming to the inner surface of the ring 1, preferably the magnet 2 is provided with pole pieces or pole shoes 2a to provide increased area of cross-section of the unavoidable air gap between the pole faces and the inner surface of the ring 1.

For the sake of simplicity in the apparatus, the magnet 2 constitutes a permanent magnet composed of relatively high coercive force material such as aluminum-nickel-cobalt alloy permanent magnet material for example; but the invention is not limited to the use of a permanent magnet. The ring 1 is composed of soft iron or other magnetically soft material having a temperature coefficient of permeability which is preferably relatively great in the temperature range within which the apparatus is designed to operate.

Conveniently this can be accomplished by selecting a material with a Curie point near or slightly above the top operating range. The Curie point is defined as a temperature in which the material loses its ferro-magnetic properties. More specifically its relative magnetic permeability $u$ becomes unity at the Curie point. The magnetically soft member 1 is mounted in a fixed position relative to the ground for stationary equipment, or in a fixed position with respect to a vehicle in an attitude indicator. The permanent magnet 2 is so arranged that it can rotate freely with respect to the periphery of the fixed magnetic soft part 1 although not necessarily within it as illustrated in the embodiment of FIG. 1.

In the embodiment of FIG. 1 the magnet 2 is free to rotate within the ring 1 and can rest in any position along a diameter of the ring 1 as long as this ring has uniform temperature. If a part of the ring 1 is heated up to its Curie temperature, the magnet 1 has only one stable position which is perpendicular to the influx of heat shown schematically by arrows 5a to 5c. The heated portion of the ring offers a higher magnetic resistance or reluctance than the opposite cool section. Accordingly, the magnet 2 positions itself so that its magnetic lines of force 6a and 6b meet a minimum reluctance which occurs in the cool section of the ring 1 which maintains a temperature close to the environment by convection, radiation and conduction.

The stable position of the magnet 2 as shown in FIG. 1 is one characterized by a minimum of energy. This position in the embodiment of FIG. 1 is perpendicular to a line marking the hottest and coolest spots of ring 1. It will be observed also that the pole faces or pole shoes 2a are both away from the hottest part of the ring 1.

This is true as long as the hot and cool spots are distinguished by the difference in magnetic permeability. It is not necessary that the hot portion be above the Curie temperature of the ring material. Exceeding the Curie temperature, however, is advantageous since this situation results in a maximum of permeability ratio between hot and cold sections, which in turn results in a maximum restoring force of the magnet 2 to overcome disturbing forces such as caused by wind or the weight of controlled elements and the like.

In a heliostat, the ring 1 preferably has a surface with a high radiation absorption coefficient, such as a blackened or roughened surface. Its Curie temperature required is approximately in the range from 100° F. to 500° F. depending on absorption coefficient and on heat loss due to convection or otherwise.

Although the invention is not limited to the use of any particular temperature variable magnetic permeability material, satisfactory results have been obtained and materials with Curie temperatures in a desired range have been found by utilizing metallic iron-nickel alloys or non-magnetic material such as certain ceramic oxides known as ferrites, e.g. nickel-zinc ferrites. The constituent ratios in these compounds determine the Curie temperature as is known to those skilled in the art. Ferrites are preferable because they have good heat absorbing and heat emitting characteristics. Moreover, ferrites are relatively low in cost in comparison with magnetic alloys.

These materials have the desired low heat conduction as well as low Curie points if of proper composition. Zinc oxide lowers the Curie temperature of mixed ferrites. The following table gives the composition of suitable nickel-zinc ferrites and their operating temperatures.

| Mol Percent | | | Curie Temperature, °C. |
|---|---|---|---|
| NiO | ZnO | Fe$_2$O$_3$ | |
| 10 | 40 | 50 | 40 |
| 13 | 37 | 50 | 65 |
| 15 | 35 | 50 | 80 |

Similar results are obtained if manganese oxide is substituted for nickel oxide. Small amounts of copper oxide, cobalt oxide, or magnetite can be added to modify their characteristics. Also, metallic magnetic materials with low Curie temperatures are applicable. Among these are gadolinium with a Curie temperature of 16° C. and 29:71% nickel-iron alloy with a Curie temperature of 25.6° C.

The torque is given by the expression $$T = F^2 \times \frac{dP}{dO}$$

where T is the torque, F is the magnetomotive force, given in this case by the strength of the permanent magnet 2, O is the angle establishing the position of magnet 2, and P is the permeance of the magnetic circuit comprised of air gaps and magnetic ring.

$$P = \frac{2u_0 A_1}{g} + \frac{u A_2}{L}$$

where $u_0$ is the permeability of air in the gaps between rotatable magnet and stationary ring, $A_1$ is the area of the gaps, $g$ is the spacing of gaps, $u$ is the permeability of the cool portion of ring 1, $A_2$ is the sectional area of ring 1, L is the mean length of the path of the magnetic lines 6a and 6b in ring 1.

It is evident that the two air gaps have to be held small so that the total gap permeance is not substantially smaller than the ring permeance which varies as $$\frac{dP}{d\theta} = \frac{A_2}{L} \frac{du}{d\theta}$$

The temperature distribution through ring 1 as function of $\theta$ is determined by the heat absorption of the exposed surface and by convection, conduction and radiation of the unexposed surfaces. A high temperature difference is obtained, if the ring surface has a high absorption and emission coefficient. Also, contact of the unexposed surface with a heat sink is preferable. The surface to volume ratio of ring 1 is made high for the same reason. Furthermore, a magnetic material with a low heat conductivity is selected such as one of the ceramic oxides, for example, described above.

In order to accomplish the effect of a heat sink, withdrawing heat from the portion 101 of the ring 1, a set of cooling fins 102 is provided, which are preferably integral with a base strap or arc 103 brought into good heat conducting relation to the portion 101 of the ring by filling the space between the elements 101 and 103 with a suitable thermally conducting cement, flux or the like.

FIG. 3 illustrates the manner of employing a simple heliostat unit such as that of FIGS. 1 and 2 for automatically controlling a set of louvres or blinds. The magnet 2 of the unit is attached to a slat 7 of a set of louvres 7 through 12 which are coupled by a connecting rod 13 for rotating each of the slats about their longitudinal axes, preferably through the centers thereof. Solar radiation is indicated by arrows 14. In closed position, the slats 7 to 12 have clearance to follow the sun through an arc of nearly 180°. The axes of the louvres may be either vertical or horizontal. It will be observed that the heliostat unit is mounted with a heat sink or cooling fins 102 on the inside or shady side of the window or opening controlled by the louvres away from the radiant source 14.

Figure 4:
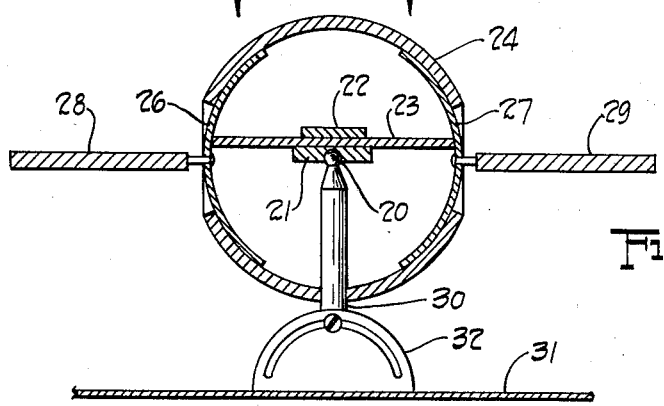
FIG. 4 is a diagrammatic view in section of a self-orienting radiant energy conversion or utilization device adapted to adjust itself with respect to transverse axes of rotation.
Figure 5:
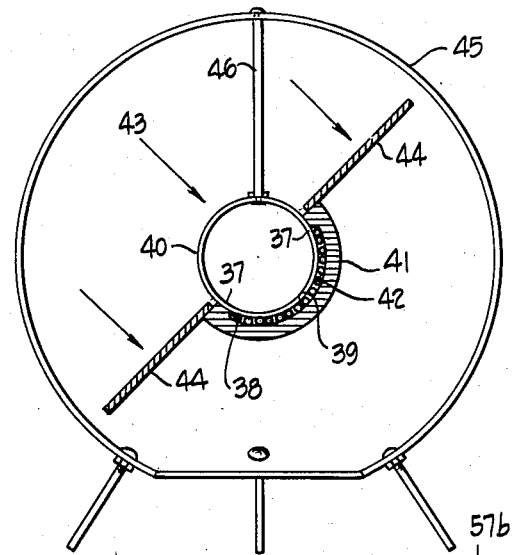
FIG. 5 is a diagrammatic view partially in section of a modification of the apparatus of FIG. 1 in which an orienting magnet is magnetically supported upon a permeable magnetic heat responsive member.

FIGS. 1, 2 and 3 illustrate apparatus for following the motion of a radiant energy source about one axis only. The invention is not limited thereto, however, and as illustrated in FIGS. 4 and 5 rotation about transverse axes or universal motion may be employed for following the radiant energy source such as the sun, for example, completely during both daily and seasonal cycles as desirable for the optimum utilization of energy converters and the like. For instance, as shown in FIG. 4 a ball and socket arrangement is provided comprising a ball 20 at the end of a mounting post 30 and a socket clamp 21 securing a pair of transversely extending permanent magnets 22 and 23, which are thus free to rotate by almost half a solid angle.

In place of a magnetically soft ring, a hollow spherical body 24 of permeable magnetic material is provided which is so mounted as to be exposed to radiation from a source of radiant energy such as solar radiation indicated by arrows 25a and 25b. The assembly is so positioned that the plane of the drawing coincides with a vertical plane in the north-south direction. Thus, the magnet 22 follows the daily swing of the sun. Seasonal variations of the sun's path are taken care of by a magnet 23 which has magnetic pole pieces 26 and 27 extending arcuately and covering openings in the body 24. Energy consuming devices 28 and 29 are attached to the pole pieces 26 and 27 in such a manner that the flat faces of the energy consuming devices 28 and 29 lie perpendicular to the direction of the radiation source indicated by arrows 25a and 25b. Thus, these faces always face the sun as the sun's rays move relative to the earth and the magnets 22 and 23 follow the variations in the hottest portion of the surface of the hollow spherical member 24.

The entire assembly is supported by the post 30 which is mounted angularly adjustable with respect to a base plate 31 by means of a graduated semicircular support 32. The angle between the horizontal base plate 31 and the post 30 is set in accordance with the geographical latitude of the location, the position shown in the drawing corresponding to a location for use on the equator.

The embodiments of the invention illustrated in FIGS. 1 to 4 disclose permanent magnets pivotally mounted within a ring shaped hollow spherical or other form of peripheral member. Nevertheless, it will be understood that the invention is not limited thereto, nor to having a permanent magnet extend along or even having the lines of force between the pole pieces of the permanent magnet extend along a diameter of the peripheral member. The permanent magnet may also be externally mounted with the pole pieces or pole faces so arranged that the magnetic lines of force between the pole faces are directed either along a diameter or arc or otherwise transversely with respect to the configuration of the peripheral permeable magnetic material.

For example, as illustrated in FIG. 5 a magnetically soft, spherical-shaped core 40 is provided which is preferably hollow in order to be more responsive in temperature to radiation falling upon a side thereof. A bowl shaped permanent magnet 41 is provided which is located outside the sphere 40. For spacing the permanent magnet 41 from the spherical surface and to permit motion thereof, non-magnetic balls 42 are provided in a socket 39 arranged to conform to a spherical surface and terminating in shoulders or edges 38 for confining the non-magnetic balls 42. The support of the magnet 41 is maintained by magnetic attraction between the magnet and the core 40. As in the previously described embodiments of the invention, the magnet 41 positions itself with the line between its pole faces 37 perpendicular to incoming radiation 43 which heats the exposed side of the magnetic sphere 40, reducing its magnetic permeability.

Energy converters or other radiation responsive or utilization elements 44 are secured to the magnet 41. The assembly may be mounted, inside a protecting enclosure in the form of a transparent sphere or frame 45, upon a support 46. Openings in the sphere 45 (not shown) may be provided which serve to cool the assembly. In similar fashion the embodiments of FIGS. 1 to 4 may be protected by a transparent cover to reduce the effects of wind and dust.

FIG. 5 illustrates in part a space-vehicle and a manner of employing the invention in satellites or space vehicles. The energy converters 44 and support 46 represent elements of such a space-vehicle in which the energy converters 44 are directed toward the sun. In case of a disturbing torque such as might arise from a meteor impact, the two main sections 40 and 41 start to rotate in opposite directions. This rotation is dampened by the friction of the ball bearings 39 until it stops. Thus a simple means for stopping spin is provided in addition to automatically controlling the position of solar energy converters 44.

Figure 6:
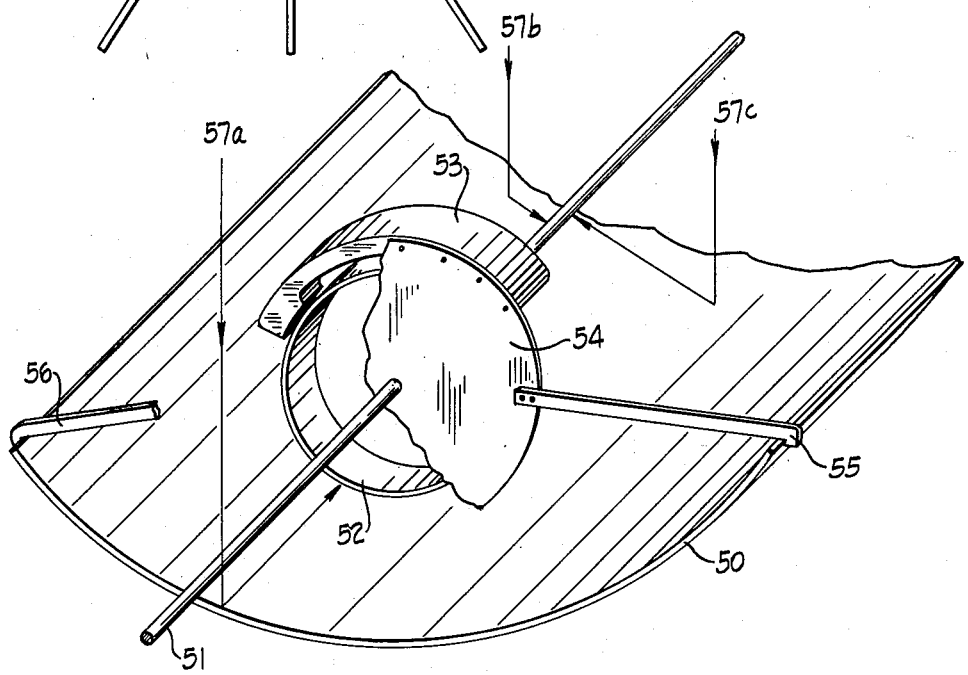
FIG. 6 is a diagrammatic view in perspective of a self-orienting condenser for the rays of the sun or other source of radiant energy for heating a longitudinal member.

In the embodiment of the invention illustrated in FIG. 6 a cylindrical collecting mirror 50 is provided which is rotatable about its focal axis represented by a tube 51. The arrangement is such that water or other liquid to be heated or evaporated may be passed through the tube 51. The tube 51 is set up in a north-south direction and inclined so that it is perpendicular to the path of the sun when over the equator. A magnetically soft core 52 of hollow cylindrical or annular form is provided and fastened to the tube 51.

For co-operation with the permeable magnetic core 52 a permanent magnet 53 is provided somewhat similar in configuration to the permanent magnet 42 of FIG. 5. To enable the permanent magnet 53 to rotate about the tube 51 any suitable rotatable support is provided such as disk 54. The cylindrical mirror 50 is rotatably mounted to rotate with the permanent magnet 53, for example, by being secured to the rotatable disk 54 carrying the magnet 53. As shown, supporting arms 55 and 56 may be employed for spacing the cylindrical mirror 50 sufficiently from the hollow cylindrical or annular core 52.

Reflected solar radiation 57a, b and c is condensed either upon the ring 52 or upon the tube 51 which lies along the focal axis of the mirror 50. The heated portion of the ring 52 is brought toward or above the Curie temperature. Accordingly, the magnet 53 rotates until it is opposite the hot region or along the side of the ring 52 away from the portion upon which the reflected rays of the sun impinge. In this manner the mirror 50 is made to follow the sun about its daily semicircle and the sun's heat is directed at all times upon the tube 51 or other member to be heated lying along the focal axis of the mirror 50. In the absence of sunshine as during the night, the mirror 50 rotates to a position facing east. This is accomplished by a slight weight unbalance of the mirror with respect to the axis 51. Thus the mirror is always in the right starting position in the morning.

Certain embodiments of the invention and certain methods of operation inbased therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention.

I claim:

1. Thermomagnetic orientation apparatus comprising in combination a ring composed of permeable magnetic material having a relatively high temperature coefficient of magnetic permeability and a magnet mounted rotatable about the center of the ring and lying along a diameter of the ring, the ring being adapted to be positioned with a side thereof exposed to a source of radiation, whereby the portion of the ring upon which radiation falls absorbs such radiation and is heated, unbalancing the magnetic permeability around the ring and causing the magnet to rotate to a position substantially perpendicular to the direction from which radiation is received.

2. Thermomagnetic orientation apparatus for operation within a predetermined temperature range, said apparatus comprising in combination a ring composed of permeable magnetic material having a Curie point near the upper end of the operating temperature range of the apparatus and having a surface with a relatively high radiation absorption coefficient, and a magnet mounted rotatable about the center of the ring so as to lie continuously along some diameter of the ring, the ring being adapted to positioning with one side exposed to a source of radiation and the other side away from the source of radiation, whereby the portion of the ring upon which the radiation falls absorbs such radiation and is heated, unbalancing the magnetic permeability around the ring and causing the magnet to rotate to a position perpendicular to the direction from which radiation is received.

3. Thermomagnetic orientation apparatus as in claim 2 wherein cooling fins are provided for the side of the ring away from the source of radiation.

4. Apparatus as in claim 1 wherein the magnet comprises high coercive force permanent magnet material and the ring comprises ferrites.

5. Thermomagnetic orientation apparatus comprising in combination a peripheral member composed of nickel-zinc ferrites and a magnet mounted rotatable about a point within the peripheral member with the flux path of the magnet including the peripheral member, the peripheral member being adapted to be positioned with a side thereof exposed to a source of radiation, whereby the portion of the peripheral member upon which radiation falls absorbs such radiation and is heated, unbalancing the magnetic permeability in the periphery of the peripheral member and causing the magnet to rotate to a position substantially perpendicular to the direction from which radiation is received.

6. Thermomagnetic orientation apparatus comprising in combination, a peripheral member composed of permeable magnetic material having a relatively high temperature coefficient of magnetic permeability and a magnet mounted rotatable about a point within the peripheral member with a magnetic field including the peripheral member for different positions of the magnet, the peripheral member being adapted to be positioned with a side thereof exposed to a source of radiation, whereby the portion of the peripheral member upon which radiation falls absorbs such radiation and is heated, unbalancing the magnetic permeability around the periphery of the peripheral member and causing the magnet to rotate to a position substantially perpendicular to the direction from which radiation is received.

7. Apparatus as in claim 6 wherein a heat sink is provided contacting the unexposed surface of the peripheral member.

8. Apparatus as in claim 6 wherein the peripheral member has a relatively high ratio of surface to volume.

9. Apparatus as in claim 6 wherein the permeable magnetic material has relatively low heat conductivity.

10. Apparatus as in claim 6 wherein the peripheral member is composed of a mixture of ferrites consisting of approximately 10% nickel oxide, 40% zinc oxide and 50% ferric oxide measured in gram molecules and substantially no other ingredients.

11. Apparatus as in claim 6 wherein the peripheral member comprises approximately 13% nickel oxide, 37% zinc oxide and 50% ferric oxide measured in gram molecules and substantially no other ingredients.

12. Apparatus as in claim 6 wherein the peripheral member comprises approximately 15% nickel oxide, 35% zinc oxide and 50% ferric oxide measured in gram molecules and substantially no other ingredients.

13. Apparatus as in claim 6 wherein the peripheral member comprises between 10% and 15% manganese oxide, between 35% and 40% zinc oxide and approximately 50% ferric oxide measured in gram molecules and substantially no other ingredients.

14. Apparatus as in claim 6 wherein the peripheral member comprises between 10% and 15% nickel oxide, between approximately 35% and 40% zinc oxide, approximately 50% ferric oxide and minor proportions of substances selected from the group consisting of copper oxide, cobalt oxide and magnetite and substantially no other ingredients.

15. Apparatus as in claim 6 wherein the peripheral member consists of nickel oxide, zinc oxide, ferric oxide and a substance selected from the group consisting of copper oxide, cobalt oxide and magnetite with the ferric oxide constituting approximately one-half the whole measured in gram molecules, and a substance selected from the group consisting of copper oxide, cobalt oxide and magnetite is present in minor proportions.

16. Apparatus as in claim 6 wherein the peripheral member comprises a metallic iron-nickel alloy.

17. Apparatus as in claim 6 wherein the peripheral member comprises metallic gadolinium.

18. Apparatus as in claim 6 wherein the peripheral member consists substantially of approximately 29% nickel and 71% iron measured in gram molecules.

19. Apparatus as in claim 6 wherein the peripheral member comprises a magnetic substance with a Curie temperature between approximately 16° F. and 80° F.

20. A Venetian blind having an exterior side exposed to sun and comprising in combination a plurality of slats each having a pivot axis longitudinal thereof, the pivot axes of the slats being parallel and the slats being mounted adjacent one another, connecting means joining the slats to cause them to rotate in unison about their pivot axes and remain parallel to each other, a permanent magnet secured to one of the slats extending perpendicular to its axis of rotation and parallel to the slat, the permanent magnet being rotatable with the slat to which it is secured, and a peripheral member surrounding the permanent magnet with substantially circular cross-sections, the inner-diameter of the periphery being sufficiently greater than the length of the magnet to provide a small air gap between the ends of the magnet and the inner-periphery of the peripheral member, the peripheral member being composed of a substance having a relatively high temperature coefficient of magnetic permeability and having a side exposed to the exterior side of the blind, whereby the exposed side of the peripheral member is heated by any sun falling thereon, causing an unbalance of magnetic permeability around the periphery of the peripheral member and rotating the magnet and the slats to a position substantially perpendicular to the direction of the sun.

21. Thermomagnetic orientation apparatus comprising in combination a hollow peripheral member composed of permeable magnetic material having a relatively high temperature coefficient of magnet permeability and a magnet mounted rotatable about the center of the hollow peripheral member and lying along a diameter thereof, the hollow peripheral member being adapted to be exposed to a source of radiation, whereby the portion of the hollow peripheral member upon which radiation falls absorbs such radiation and is heated, unbalancing the magnetic permeability around the hollow peripheral member and causing the magnet to rotate to a position substantially perpendicular to the direction from which the radiation is received.

22. Apparatus as in claim 21 wherein the magnet is mounted upon a ball and socket joint to form a freely movable element.

23. Apparatus as in claim 22 wherein a second magnet is secured to the first magnet extending substantially perpendicular thereto, whereby one magnet controls the position of the movable element in azimuth and the other magnet controls the position of the movable element in altitude.

24. Apparatus as in claim 21 wherein the hollow peripheral member is provided with openings, with members secured to the permanent magnet and projecting radially outward through said openings, said projecting members carrying radiation-energy responsive elements whereby the motion of the permanent magnet serves to orient said radiation responsive elements to the optimum angular position with respect to the source of radiation.

25. Thermomagnetic orientation apparatus comprising in combination a hollow spherical member composed of permeable magnetic material having a relatively high temperature coefficient of magnetic permeability, a bowl-shaped permanent magnet conforming in shape to the outer periphery of the hollow spherical member, non-magnetic balls spacing the bowl-shaped permanent magnet from the hollow spherical member and means for confining the balls, whereby the magnet is supported against the hollow spherical member by magnetic attraction and positions itself around the surface of the hollow spherical member at the angle of minimum magnetic energy in response to variations in relative magnetic permeability around the periphery of the hollow spherical member.

26. Thermomagnetic orientation apparatus comprising in combination a ring composed of permeable magnetic material having a relatively high temperature coefficient of magnetic permeability and a magnet rotatably mounted with an axis of rotation at the center of the ring and with pole faces in proximity to two arcuately spaced portions of the ring, the ring being adapted to be positioned with a side thereof exposed to a source of radiation, whereby the portion of the ring upon which radiation falls absorbs such radiation and is heated, unbalancing the magnetic permeability around the ring and causing the magnet to rotate to a position away from the heated portion of the ring.

27. Apparatus as in claim 26 wherein a focussing mirror having a focus substantially at the center of the ring is secured to the magnet for rotation with the magnet so as to follow changes in the direction of the source of radiation and continuously direct the radiation toward the magnetic ring.

28. Apparatus as in claim 27 wherein the ring is mounted with its axis substantially perpendicular to the path of a moving source of radiation.

29. Apparatus as in claim 28 wherein a longitudinal object to be heated by a source of radiation is mounted along the axis of the magnetic ring.

30. Thermomagnetic orientation apparatus for operation in a range of temperatures, comprising a magnetically soft member with a relatively high temperature coefficient of magnetic permeability within the operating temperature range and having a continuous surface, and a magnet mounted with pole-piece means adjacent said surface, capable of movement along the surface of the magnetically soft member, the latter being adapted to be exposed to a heat source causing a temperature difference between different portions of the magnetically soft member and hence a permeability difference between such portions for determining the position of the movable magnet relative to the magnetically soft member.

31. Thermomagnetic orientation comprising a magnetically soft member with a high temperature coefficient of magnetic permeability, a magnet movable with respect thereto with pole face means constrained to move along said magnetically soft member from one portion thereof to another, means for exposing the magnetically soft member partially to an energy source for producing a temperature gradient therein and differences in permeability between portions of the magnetically soft member for determining the position of the magnet with respect thereto.

References Cited in the file of this patent

UNITED STATES PATENTS

| | | |
|---|---|---|
| 2,478,117 | Mesh | Aug. 2, 1949 |
| 2,489,879 | Grebe | Nov. 29, 1949 |
| 2,535,025 | Albers-Schoenberg | Dec. 26, 1950 |
| 2,668,944 | Schwyn et al. | Feb. 9, 1954 |
| 2,917,795 | Brown | Dec. 22, 1959 |

OTHER REFERENCES

Journal of Applied Physics, volume 30, Number 11, November 1959, by J. F. Elliott.